United States Patent Office 2,780,627
Patented Feb. 5, 1957

2,780,627
SYNTHESIS OF PYRIDINES

Alexander F. MacLean and Charles C. Hobbs, Jr., Corpus Christi, Tex., assignors to Celanese Corporation of America, New York, N. Y., a corporation of Delaware No Drawing. Application February 2, 1954,
Serial No. 407,821

17 Claims. (Cl. 260—290)

This invention relates to the production of pyridines and relates more particularly to the production of picoline from a tetraalkoxyhexane.

It is an object of this invention to provide a novel, economical and efficient process for the synthesis of pyridines.

A further object of this invention is the provision of a novel process for the synthesis of picoline by reacting a tetraalkoxyhexane with ammonia.

Other objects of this invention will be apparent from the following description and claims.

According to this invention, pyridines are produced by reacting ammonia with a 1,1,3,5-tetraalkoxypentane. This reaction may be illustrated by the following equation, showing the reaction of ammonia with 1,1,3,5-tetramethoxy-5-methyl-pentane, otherwise known as 1,1,3,5-tetramethoxyhexane, to produce 2-picoline:

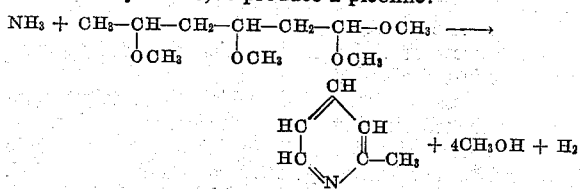

The tetraalkoxypentane employed as a reactant in the process of this invention is advantageously one containing lower alkoxy groups, such as methoxy, ethoxy, propoxy, or butoxy groups. All of the alkoxy groups may be the same, as in 1,1,3,5-tetramethoxyhexane, or the alkoxy groups may be different, as in 1,1-dimethoxy-3,5-diethoxyhexane. The tetraalkoxypentane may be unsubstituted, e. g. 1,1,3,5-tetramethoxypentane, or it may carry substituents such as hydrocarbon or substituted hydrocarbon groups, depending on the type of pyridine desired. Thus, if a 2-alkyl pyridine, such as 2-ethylpyridine, is desired, a 5-alkyltetraalkoxypentane, such as 1,1,3,5-tetramethoxy-5-ethylpentane, otherwise known as 1,1,3,5-tetramethoxyheptane, may be employed as the reactant. Other pyridines are produced when there are employed tetraalkoxypentanes having substituted hydrocarbon substituents, e. g. alkoxyalkyl substituents as in 1,1,3,5-tetramethoxy-5-(2-methoxy)propyl-pentane, otherwise known as 1,1,3,5,7-pentamethoxyoctane. It is desirable, of course, to employ tetraalkoxy pentanes whose substituents, if any, do not materially interfere with the course of the reaction. The 1,1,3,5-tetraalkoxypentane used as the starting material should have at least one hydrogen atom on the carbon atom in the 2-position and at least one hydrogen atom on the carbon atom in the 4-position. It is desirable that the tetraalkoxypentane be used in more or less pure form. However, excellent results have been obtained, with no diminution in yield, by using tetraalkoxypentanes containing minor amounts of impurities such as water and methanol.

The ammonia employed as a reaction in the process of this invention may be supplied in any convenient form, but best results are obtained when gaseous ammonia is used. It is desirable to supply more than one mole of ammonia, e. g. about 3 to 20 moles of ammonia, per mole of tetraalkoxypentane and to carry out the reaction of these materials in the vapor phase at an elevated temperature, e. g. a temperature of about 200 to 500° C., preferably about 300 to 350° C., in the presence of a dehydrogenation catalyst. The reaction may be carried out under atmospheric, superatmospheric or subatmospheric pressure.

The catalyst preferably employed in the process of the present invention may be any of the known dehydrogenation catalysts, such as, for example, alumina, chromic oxide, silica gel, thallic oxide on silica gel, thorium oxide on silica gel or mixed silica-alumina gel. Especially good results are obtained by the use of activated alumina and particularly by the use of activated alumina coated with chromic oxide. The catalyst may be used in the form of a fixed bed or, more desirably, may be in fluidized form. In the latter case the size of the particles of catalyst should be very small, e. g. about 80 to 200 mesh (U. S. Standard Screen Size) or smaller.

In the practice of the process of this invention an improvement in the yield of pyridine bases can be obtained in some cases by employing a catalyst promoter which is added in small quantities to the reactants. For example, increased yields can be obtained, when the catalyst is silica gel, by the addition of small amounts of hydrochloric acid.

The process of the present invention lends itself readily to either batchwise or continuous operation, although best results are obtained by a continuous process in which a stream of ammonia and vapors of the tetraalkoxypentane is passed into contact with fluidized dehydrogenation catalyst, following which the reacted vapors are condensed. In the continuous process the space velocity may be varied widely, e. g. from about 50 to about 5000 volumes of gaseous reactants (S. T. P.) per volume of catalyst in fluidized state per hour.

The following examples are given to illustrate the invention further.

Example I

Liquid 1,1,3,5-tetramethoxyhexane, which may be obtained in a well known manner by the condensation of methyl vinyl ether and methanol in the presence of a Friedel-Crafts catalyst, is vaporized continuously and the resulting vapor stream is heated to a temperature of 287° C. and combined continuously with a stream of ammonia gas having a temperature of 325° C. in such proportions as to provide 8 moles of ammonia per mole of 1,1,3,5-tetramethoxyhexane. The mixture of ammonia and 1,1,3,5-tetramethoxyhexane is passed continuously upwardly through a reactor, whose height is about 50 times its width. The reactor, which is maintained at a temperature of about 325° C., contains catalyst particles of activated alumina carrying on their surfaces a coating of chromic oxide in the amount of 6% of the weight of the alumina. The bulk volume of the catalyst is about one half the volume of the reactor, but, when the catalyst is fluidized by the stream of reactants flowing therethrough, the fluidized catalyst fills the reactor. The stream of reactants flows through the reactor at a space velocity equal to 375 to 425 volumes of gaseous reactants (at standard temperature and pressure) per volume of reactor per hour. The vapors leaving the reactor are condensed and collected in a receiver, which receiver is cooled with ice water to a temperature of about 0° C., and any uncondensed vapors are scrubbed by passing them through water. The pyridine bases are recovered by distillation from the condensed vapors and scrub water. The 1,1,3,5-tetramethoxyhexane is found to react completely under the above conditions and to be converted to the extent of about 61% to pyridines, of which more than ⅖ is 2-picoline. About 3% of the 1,1,3,5-tetramethoxyhexane is converted to lutidines and a similar amount to collidines.

The catalyst used in this example is prepared by mixing particles of activated alumina with an aqueous solution of Cr(NO₃)₃·9H₂O and evaporating the mixture to dryness while stirring. The Cr(NO₃)₃ adsorbed on the alumina is then decomposed by heating the dry mixture and the resulting material is screened to provide a mixture of particles which pass through an 80 mesh screen but are retained on a 200 mesh screen. The particles which fail to pass through the 80 mesh screen are then crushed to a size of 80 to 200 mesh and blended with the aforesaid mixture of particles.

*Example II*

Example I is repeated using 1,1,3,5,7-pentamethoxyoctane in place of the 1,1,3,5-tetramethoxypentane. A 36.9% yield of pyridines is obtained.

*Example III*

Example I is repeated except that the catalyst employed is silica gel having a particle size of 80 to 200 mesh and a 1.33 N aqueous solution of hydrochloric acid, preheated to the reactor temperature, is injected into the reactor at a rate equal to 1 part by weight of the liquid hydrochloric acid solution to 5.7 parts by weight of the liquid 1,1,3,5-tetramethoxyhexane. A yield of about 46 to 47% of pyridine bases is obtained, as compared with a yield of about 40 to 41% using the same catalyst with no hydrochloric acid.

It is to be understood that the foregoing detailed description is given merely by way of illustration and that many variations may be made therein without departing from the spirit of our invention.

Having described our invention what we desire to secure by Letters Patent is:

1. The process which comprises reacting a 1,1,3,5-tetra (lower alkoxy) pentane with ammonia under dehydrogenating conditions, while splitting off hydrogen and an alcohol, whereby a pyridine is produced, and recovering said pyridine from the resulting reaction products.

2. The process which comprises reacting, by heating, a 1,1,3,5-tetra (lower alkoxy) pentane with ammonia under dehydrogenating conditions, while splitting off hydrogen and an alcohol, whereby a pyridine is produced, and recovering said pyridine from the resulting reaction products.

3. The process which comprises reacting, by heating in the vapor phase, a 1,1,3,5-tetra (lower alkoxy) pentane with ammonia under dehydrogenating conditions, while splitting off hydrogen and an alcohol, whereby a pyridine is produced, and recovering said pyridine from the resulting reaction products.

4. The process which comprises reacting a 1,1,3,5-tetra (lower alkoxy) pentane with ammonia, by heating, in the vapor phase in the presence of a dehydrogenation catalyst whereby a pyridine is produced.

5. The process which comprises reacting a 1,1,3,5-tetra (lower alkoxy) pentane with ammonia at an elevated temperature in the vapor phase in the presence of a dehydrogenation catalyst at a temperature of about 200 to 500° C. whereby a pyridine is produced.

6. Process of claim 5 in which the catalyst comprises activated alumina.

7. Process of claim 6 in which the catalyst comprises activated alumina coated with chromic oxide.

8. The process which comprises reacting, by heating in the presence of a dehydrogenation catalyst, a 1,1,3,5-tetra (lower alkoxy) pentane with ammonia under dehydrogenating conditions, while splitting off hydrogen and an alcohol, whereby a pyridine is produced, and recovering said pyridine from the resulting reaction products.

9. Process of claim 5 in which the catalyst is in fluidized form.

10. Process for the productions of a pyridine which comprises reacting 1,1,3,5-tetramethoxyhexane with ammonia while splitting off hydrogen to produce 2-picoline.

11. Process for the production of a pyridine which comprises reacting 1,1,3,5-tetramethoxyhexane with ammonia while splitting off hydrogen at an elevated temperature in the vapor phase in the presence of a dehydrogenation catalyst to produce 2-picoline.

12. Process of claim 11 in which the temperature is about 200 to 500° C.

13. Process of claim 12 in which the catalyst comprises activated alumina.

14. Process of claim 13 in which the catalyst comprises activated alumina coated with chromic oxide.

15. Process of claim 14 in which the catalyst is in fluidized form and the temperature is about 300 to 350° C.

16. Process of claim 11 in which the 2-picoline is recovered by condensing the reacted vapors.

17. Process of claim 11 in which the temperature is about 200 to 500° C. and the catalyst is in fluidized form.

References Cited in the file of this patent

Kline: Jour. Am. Chem. Soc., vol. 66, pp. 1710–14 (1944).